United States Patent
Phan et al.

(10) Patent No.: US 10,274,606 B1
(45) Date of Patent: Apr. 30, 2019

(54) HIGH INTEGRITY PARTIAL ALMOST FIX SOLUTION

(71) Applicant: Rockwell Collins, Inc., Cedar Rapids, IA (US)

(72) Inventors: Huan T. Phan, Cedar Rapids, IA (US); Gary A. McGraw, Cedar Rapids, IA (US); Michael J. Armatys, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 358 days.

(21) Appl. No.: 15/065,260

(22) Filed: Mar. 9, 2016

(51) Int. Cl.
| | |
|---|---|
| *G01S 19/44* | (2010.01) |
| *G01S 19/41* | (2010.01) |
| *G01S 19/55* | (2010.01) |
| G01S 19/07 | (2010.01) |
| G01S 19/48 | (2010.01) |

(52) U.S. Cl.
CPC .............. *G01S 19/44* (2013.01); *G01S 19/41* (2013.01); *G01S 19/55* (2013.01); *G01S 19/07* (2013.01); *G01S 19/48* (2013.01)

(58) Field of Classification Search
CPC .......... G01S 19/04; G01S 19/07; G01S 19/15; G01S 19/40; G01S 19/41; G01S 19/43; G01S 19/44; G01S 19/47; G01S 19/48; G01S 19/49; G01S 19/53; G01S 19/54; G01S 19/55
USPC .............. 342/357.24, 357.23, 357.3, 357.32, 342/357.36, 357.38, 357.44, 357.53
See application file for complete search history.

(56) References Cited

U.S. PATENT DOCUMENTS

| | | | | |
|---|---|---|---|---|
| 7,538,721 | B2 * | 5/2009 | Vollath | G01S 19/44 342/357.27 |
| 7,768,451 | B2 * | 8/2010 | Wu | G01S 19/44 342/357.23 |

(Continued)

OTHER PUBLICATIONS

Peter Joosten, et al.; "LAMBDA: FAQs"; GPS Solutions; copyright Springer-Verlag 2002; pp. 6:109-114; Published online Oct. 11, 2002; DOI 10.1007/510291-002-0004-8.

(Continued)

*Primary Examiner* — Chuong P Nguyen
(74) *Attorney, Agent, or Firm* — Angel N. Gerdzhikov; Donna P. Suchy; Daniel M. Barbieri

(57) ABSTRACT

A system and related methods for determining precision navigation solutions decorrelates GPS carrier-phase ambiguities derived from multiple-source GPS information via Least-squares AMBiguity Decorrelation Adjustment (LAMBDA) algorithms, and fixes a subset of the decorrelated integer ambiguities within the LAMBDA domain. To maintain high accuracy, a partial almost fix solution is generated using the subset of the decorrelated ambiguities to be fixed in the LAMBDA domain. The subset of decorrelated ambiguities is used to compute protection levels and the probability of almost fix (PAF), or that the navigation solution corresponding to the decorrelated ambiguities is within the region of correctly-fixed or low-error almost-fixed ambiguities. The partial list of fixed ambiguities is used to generate the optimal navigation solution (floating-point, partial almost-fix, or fully fixed) while maintaining protection levels within alert limits and PAF above the desired threshold.

14 Claims, 9 Drawing Sheets

(56) References Cited

U.S. PATENT DOCUMENTS

| | | | | |
|---|---|---|---|---|
| 7,961,143 B2* | 6/2011 | Dai | .................. | G01S 19/55 |
| | | | | 342/357.27 |
| 8,035,552 B2* | 10/2011 | Dai | .................. | G01S 19/44 |
| | | | | 342/357.23 |
| 8,368,591 B2* | 2/2013 | Talbot | ................ | G01S 19/44 |
| | | | | 342/357.27 |
| 8,542,146 B2* | 9/2013 | Vollath | ............... | G01S 19/44 |
| | | | | 342/357.27 |
| 8,614,642 B2* | 12/2013 | Talbot | ................ | G01S 19/32 |
| | | | | 342/357.73 |
| 8,717,237 B2* | 5/2014 | Vollath | ............... | G01S 19/13 |
| | | | | 342/450 |
| 8,830,121 B2* | 9/2014 | Vollath | ............... | G01S 19/44 |
| | | | | 342/357.27 |
| 9,829,582 B2* | 11/2017 | Wu | .................... | G01S 19/49 |
| 2012/0286991 A1* | 11/2012 | Chen | ................. | G01S 19/04 |
| | | | | 342/357.23 |
| 2013/0069822 A1 | 3/2013 | Wu et al. | | |

OTHER PUBLICATIONS

Samer Khanafseh, et al.; "A New Approach for Calculating Position Domain Integrity Risk for Cycle Resolution in Carrier Phase Navigation Systems"; 1-4244-1537-3/08; copyright 2008 IEEE; pp. 583-591.

P.J.G. Teunissen; "GNSS Ambiguity Bootstrapping: Theory and Application"; Proceedings of KIS2001, Jun. 5-8, 2001, pp. 246-254; Banff, Canada: University of Calgary.

Shuwu Wu, et al.; "Geometry Extra-Redundant Almost Fixed Solutions: A High Integrity Approach for Carrier Phase Ambiguity Resolution for High Accuracy Relative Navigation"; 1-4244-1537-3/08; copyright 2008 IEEE; pp. 568-582.

* cited by examiner

HIGH INTEGRITY PARTIAL ALMOST FIX SOLUTION

GOVERNMENT LICENSE RIGHTS

This invention was made with government support under Government Contract No. N00019-08-C-0034, JOINT PRECISION APPROACH AND LANDING SYSTEM DEVELOPMENT, awarded by the Department of the Navy. The government has certain rights in the invention.

BACKGROUND

In selected differential Global Positioning System (GPS) based applications, such as the Joint Precision Approach and Landing System (JPALS), relative navigation functions must meet requirements for high accuracy, high integrity, and high availability. To ensure sub-meter accuracy (e.g., within 20 cm), navigation solutions may be formed using GPS carrier phase measurements. GPS carrier phase integer ambiguities may then be fixed via a Real Time Kinematic (RTK) technique such as the Least-squares AMBiguity Decorrelation Algorithm (LAMBDA) or an integer bootstrapping algorithm. To ensure high integrity, protection levels can be computed to bound errors in the computed navigation solution to a desired degree of confidence. Protection levels depend, among other factors, on the success rate of the carrier phase integer ambiguity fixing process. Generally, if the probability of correct fix (PCF) is sufficiently high, both accuracy and protection levels may be improved with fixed integer ambiguities (as opposed to float integer ambiguities). If the PCF is not high enough, however, improved protection levels may not result from estimated fixed integer ambiguities (relative to estimated float integer ambiguities), even though nominal accuracy may improve. Consequently, both availability and accuracy may suffer, as a fixed solution may not be available after protection levels exceed alert limits.

One technique for maintaining the PCF (i.e., ensuring a reasonably high success rate) while maintaining high accuracy may involve partial ambiguity fixing: fixing only a subset of integer ambiguities that can be estimated with higher confidence while using float integer ambiguity estimates for the remainder, trading accuracy for lower protection levels. However, in the original carrier phase measurement ambiguity domain, using integer bootstrapping alone may lead to lower PCF and higher protection levels. Use of LAMBDA algorithms with integer bootstrapping to decorrelate ambiguities prior to fixing may increase the PCF and lower protection levels; however, the use of LAMBDA may complicate partial fixing.

SUMMARY

In one aspect, embodiments of the inventive concepts disclosed herein are directed to a differential GPS system for generating precision navigation solutions. The system may include processors configured to receive GPS information (e.g., GPS pseudorange and carrier phase measurements) from multiple GPS sources associated with common GPS satellites, e.g., via a GPS receiver aboard the aircraft at which the system is based as well as via a GPS receiver of a proximate vehicle (such as an aircraft carrier). The system may generate floating-point baseline navigational solutions using floating-point carrier phase ambiguities (e.g., a set of n floating-point ambiguities computed in a carrier-phase measurement ambiguity domain) based on the received GPS information. The system may decorrelate the n floating-point carrier-phase ambiguities (via. e.g., a Least-squares AMBiguity Decorrelation Adjustment (LAMBDA) algorithm) to generate a set of n floating-point ambiguities in the LAMBDA domain, each decorrelated floating-point ambiguity corresponding to a generated floating-point ambiguity in the original domain. The system may define a subset of the set of n decorrelated floating-point ambiguities (e.g., a subset of $n_f$ decorrelated ambiguities, $n_f \leq n$) to be fixed. The system may determine protection levels associated with a partial almost-fix navigation solution based on a set of Pull-in Regions (PIR) corresponding to correctly fixed ambiguities and Enlarged Pull-in Regions (EPIR) corresponding to incorrectly fixed ambiguities (e.g., low multiple-cycle or single-cycle errors), the set derived from the subset of $n_f$ decorrelated ambiguities. The system may determine a Probability of Almost Fix (PAF) based on a probability that the partial almost-fix navigation solution is bounded by the protection levels. While the PAF is above a predetermined threshold and the protection levels are below alert limits, the system may generate a set of $n_f$ fixed ambiguities by fixing the subset of $n_f$ decorrelated ambiguities in the LAMBDA domain. The system may generate the partial almost-fix navigation solution by updating the floating-point ambiguities of the floating-point navigation solution (where those ambiguities correspond to the subset of $n_f$ decorrelated ambiguities) with the fixed ambiguities based on each corresponding decorrelated ambiguity. The system may output the updated partial almost-fix navigation solution as a fixed-ambiguity navigation solution. If protection levels exceed alert limits or the PAF is below the threshold, the system may decrement the subset of $n_f$ decorrelated ambiguities by removing a decorrelated ambiguity. If the value of $n_f$ drops to zero, the system may output the original floating-point navigation solution as a fixed-ambiguity navigation solution.

In a further aspect, embodiments of the inventive concepts disclosed herein are directed to a method for determining precision navigation solutions. The method may include receiving GPS information from at least two GPS sources associated with common GPS satellites. The method may include generating floating-point baseline navigational solutions using floating-point carrier phase ambiguities (e.g., a set of n floating-point ambiguities computed in a carrier-phase measurement ambiguity domain) based on the received GPS information. The method may include decorrelating the n floating-point carrier-phase ambiguities (via. e.g., a Least-squares AMBiguity Decorrelation Adjustment (LAMBDA) algorithm) to generate a set of n decorrelated floating-point ambiguities in the LAMBDA domain, each decorrelated floating-point ambiguity corresponding to a generated floating-point ambiguity in the original domain. The method may include defining a subset of the set of n decorrelated floating-point ambiguities (e.g., a subset of $n_f$ decorrelated ambiguities, $n_f \leq n$) to be fixed. The method may include determining protection levels associated with a partial almost-fix navigation solution based on a set of Pull-in Regions (PIR) corresponding to correctly fixed ambiguities and Enlarged Pull-in Regions (EPIR) corresponding to incorrectly fixed ambiguities (e.g., low multiple-cycle or single-cycle errors), the set derived from the subset of $n_f$ decorrelated ambiguities. The method may include determining a Probability of Almost Fix (PAF) based on a probability that the partial almost-fix navigation solution is bounded by the protection levels. The method may include, while the PAF is above a predetermined threshold and the protection levels are below alert limits: generating a set of $n_f$ fixed ambiguities by fixing the subset of $n_f$ decorrelated ambiguities in the LAMBDA domain; generating the partial almost-fix navigation solution by updating the floating-point ambiguities of the floating-point navigation solution (where those ambiguities correspond to the subset of $n_f$ decorrelated ambiguities) with the fixed ambiguities based on each corresponding decorrelated ambiguity; and outputting the updated partial almost-fix navigation solution as a fixed-ambiguity navigation solution. The method may include, if protection levels exceed alert limits or the PAF is below the threshold, decrementing the subset of $n_f$ decorrelated ambiguities by removing a decorrelated ambiguity. The method may include, if the value of $n_f$ drops to zero, outputting the original floating-point navigation solution as a fixed-ambiguity navigation solution.

In a still further aspect, the embodiments of the inventive concepts disclosed herein are directed to an alternative method for determining precision navigation solutions. The method may include receiving GPS information from at least two GPS sources associated with common GPS satellites. The method may include generating floating-point baseline navigational solutions using floating-point carrier phase ambiguities (e.g., a set of n floating-point ambiguities computed in a carrier-phase measurement ambiguity domain) based on the received GPS information. The method may include decorrelating the n floating-point carrier-phase ambiguities (via. e.g., a Least-squares AMBiguity Decorrelation Adjustment (LAMBDA) algorithm) to generate a set of n decorrelated floating-point ambiguities in the LAMBDA domain, each decorrelated floating-point ambiguity corresponding to a generated floating-point ambiguity in the original domain. The method may include selecting, from the set of n decorrelated floating-point ambiguities, a decorrelated floating-point ambiguity to be fixed, and adding the selected floating-point ambiguity to a subset of $n_f$ decorrelated floating-point ambiguities. The method may include determining protection levels associated with a partial almost-fix navigation solution based on a set of Pull-in Regions (PIR) corresponding to correctly fixed ambiguities and Enlarged Pull-in Regions (EPIR) corresponding to incorrectly fixed ambiguities (e.g., low multiple-cycle or single-cycle errors), the set derived from the subset of $n_f$ decorrelated ambiguities. The method may include determining a Probability of Almost Fix (PAF) based on a probability that the partial almost-fix navigation solution is bounded by the protection levels. The method may include generating a fixed ambiguity by fixing the selected decorrelated floating-point ambiguity in the LAMBDA domain. The method may include generating the partial almost-fix navigation solution by updating the floating-point ambiguity of the floating-point navigation solution (where the floating-point ambiguity corresponds to the selected decorrelated ambiguity) with the fixed ambiguity. The method may include, while protection levels remain below alert limits and the PAF is above the threshold, incrementing the subset of $n_f$ decorrelated ambiguities by selecting an additional decorrelated floating-point ambiguity to be fixed. The method may include generating an additional fixed ambiguity by fixing the additional decorrelated floating-point ambiguity in the LAMBDA domain. The method may include updating the partial almost-fix navigation solution by updating the floating-point ambiguity of the floating-point navigation solution (where the floating-point ambiguity corresponds to the additional decorrelated ambiguity) with the additional fixed ambiguity. The method may include, if protection levels exceed alert limits or the PAF is below the threshold, reverting to the prior partial almost-fix navigation solution by updating the most recently added additional fixed ambiguity with the corresponding floating-point ambiguity of the floating-point navigation solution (i.e., the floating-point ambiguity originally replaced by the additional fixed ambiguity), and outputting the updated partial almost-fix navigation solution.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1A:
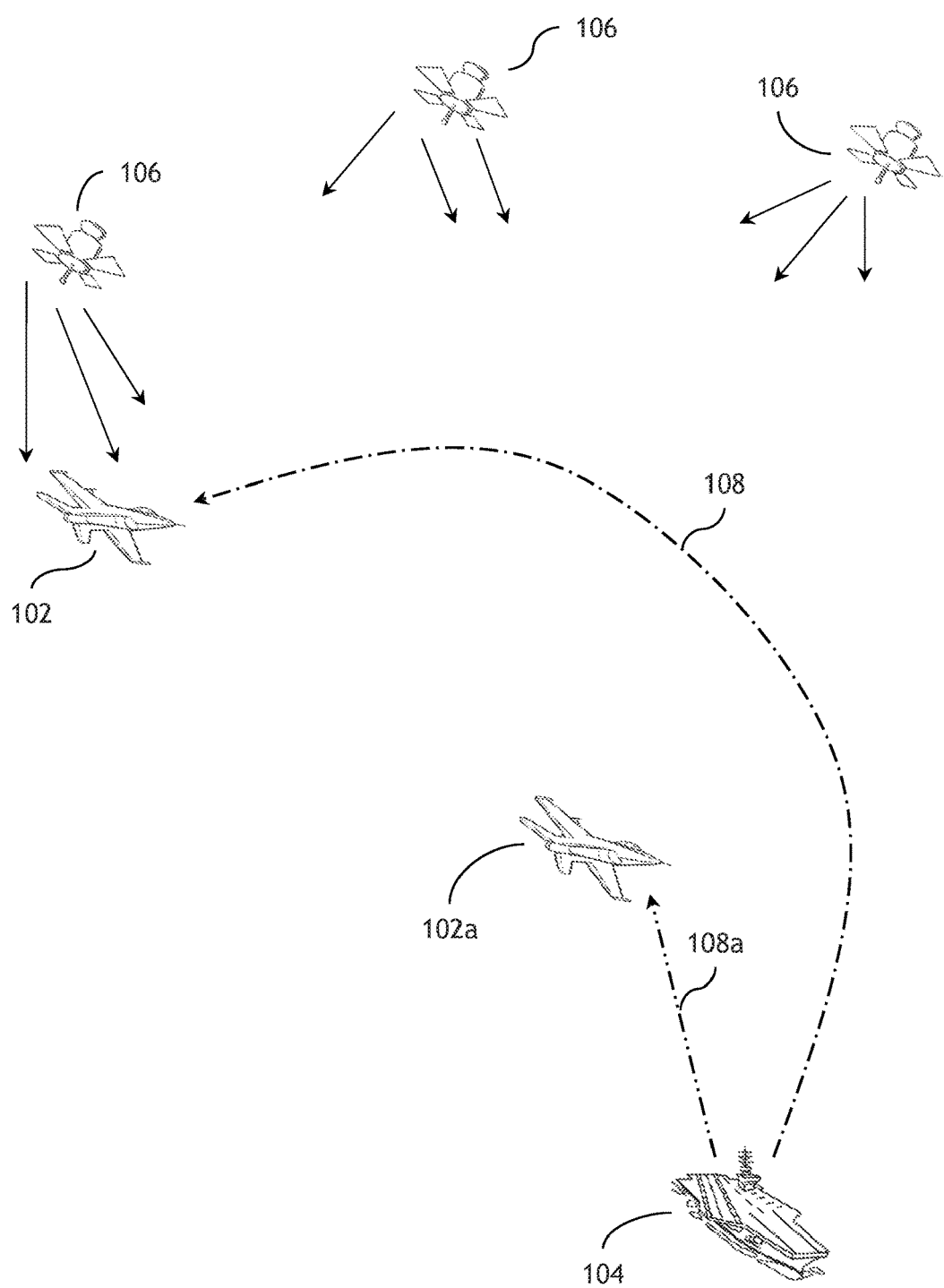
FIG. 1A illustrates exemplary embodiments of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system for determining precision navigation solutions based on GPS carrier phase measurements received from one or more GPS receivers. The system may increase the confidence level of navigation solutions by decorrelating GPS carrier phase integer ambiguities via Least-squares AMBiguity Decorrelation Adjustment (LAMBDA) and partially fixing the integer ambiguities in the LAMBDA domain. System integrity may be enhanced via Partial Almost Fixing, or determining the probability that floating-point navigation solutions are included within correct integer ambiguities or within a subset of incorrect integer ambiguities with single-cycle or small multiple-cycle errors.

Referring now to FIG. 1A, an exemplary embodiment of a system 100 according to the inventive concepts disclosed herein may be embodied in a Joint Precision Approach and Landing System (JPALS) aboard an aircraft 102 operating proximate to an aircraft carrier or similar ship 104; the aircraft 102 may be based aboard the ship 104. Both the aircraft 102 and the ship 104 may continually generate position information based on GPS signals received from one or more common GPS satellites 106. For example, the aircraft 102, not performing a precision landing operation to the ship 104, may determine its own position based on signals received from GPS satellites (which need not be common in the case of a single aircraft determining a standalone position). The aircraft 102 may also receive coarse position and speed data (108) associated with the ship 104 for the purposes of coarse relative navigation. The aircraft 102a, however, executing a precision approach operation to the ship 104 (e.g., within 10 NM of the ship 104) may receive from the ship 104 approach data and GPS measurements (108a) received in turn by the ship 104 from the common GPS satellites 106. As the aircraft 102a approaches the ship 104 (e.g., toward a landing aboard the ship 104), the ship 104 may provide increasingly sophisticated approach data 108a so that the aircraft 102a may determine a precise navigational vector for precision approach to the ship 104.

Figure 1B:
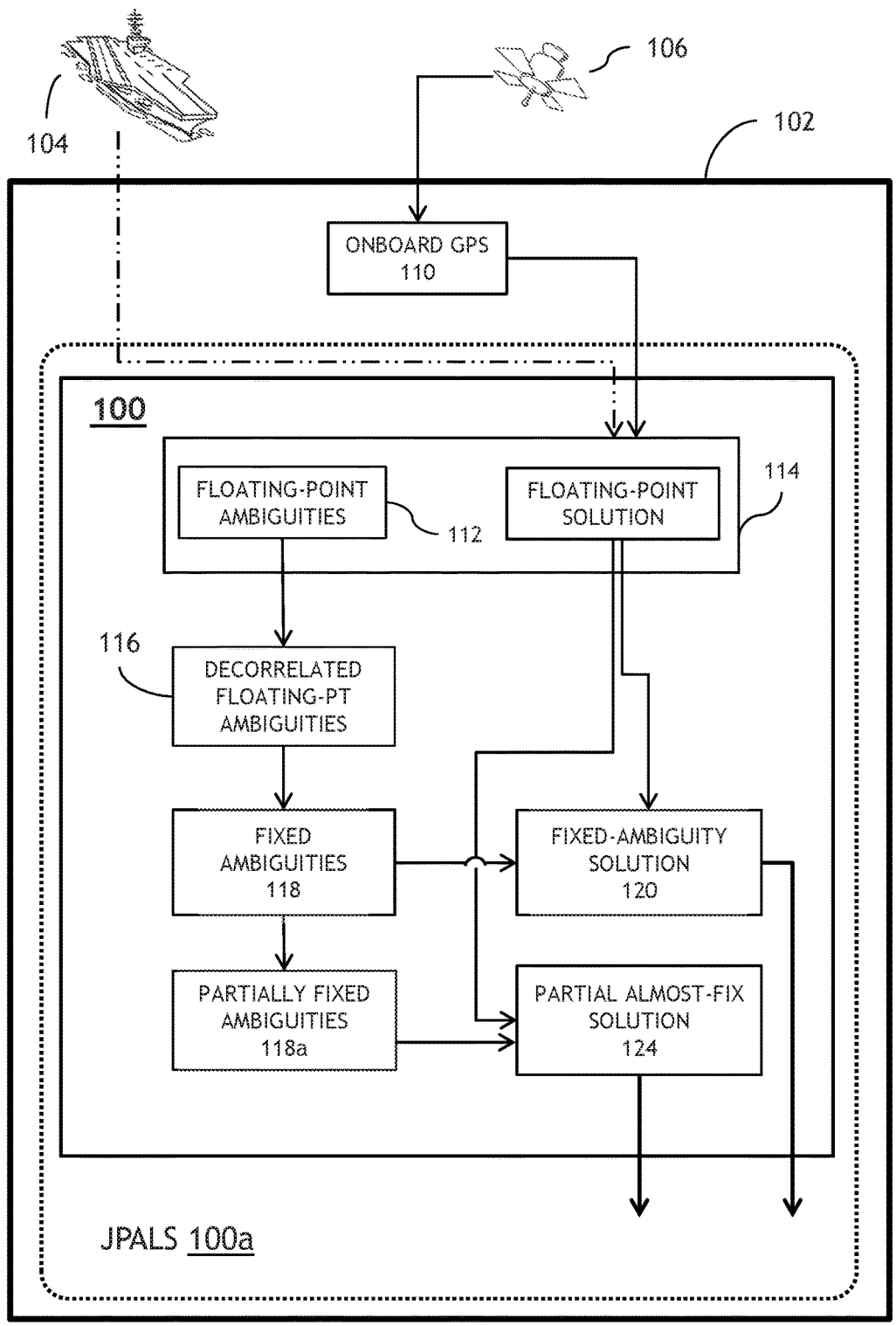
FIG. 1B is a block diagram illustrating an exemplary embodiment of a system according to the inventive concepts disclosed herein.

Referring now to FIG. 1B, an exemplary embodiment of a system 100 for determining precise navigation solutions may be embodied in aircraft-based JPALS equipment 100a aboard the aircraft 102. The system may receive GPS measurements from the common GPS satellites 106 (via an onboard GPS receiver 110) and the ship 104, including GPS carrier signals. Based on the received GPS measurements, the system 100 may generate floating-point baseline navigation solutions 114 comprising sets of GPS floating-point carrier phase ambiguities 112. For example, the floating-point baseline navigation solution 114 may include a set of n floating-point carrier phase ambiguities 112 (where n is a positive integer). The determined GPS floating-point carrier phase ambiguities 112 may be decorrelated via LAMBDA decorrelation to obtain LAMBDA-domain floating-point ambiguities 116. While existing Geometric Extra Redundancy Almost Fix Solution (GERAFS) functionality in a JPALS 100a may convert the LAMBDA-domain floating-point ambiguities 116 back to the original carrier-phase measurement ambiguity domain (e.g., via the inverse of a LAMBDA transformation matrix), the system 100 may generate LAMBDA-domain fixed integer ambiguities 118 by fixing the LAMBDA-domain floating-point ambiguities 116 in the LAMBDA domain.

For example, $\hat{a}$ may be a vector of floating-point carrier-phase ambiguities 112 in the original carrier-phase measurement ambiguity domain, $\check{a}$ may be a vector of fixed integer ambiguities (not shown) in the original carrier-phase measurement ambiguity domain, $\hat{b}$ may be a vector of an estimated floating-point baseline navigation solution 114, $\check{b}$ may be a vector of a more precise fixed-ambiguity (fully fixed) baseline navigation solution 120, $Q_{\hat{b}\hat{a}}$ may be the error covariance between the floating-point baseline navigation solution 114 and the floating-point carrier-phase ambiguities 112, and $Q_{\hat{a}}$ may be the error covariance of the floating-point carrier-phase ambiguities 112. Therefore, according to Real Time Kinematic (RTK) theory $$\check{b}=\hat{b}-Q_{\hat{b}\hat{a}}Q_{\hat{a}}^{-1}(\hat{a}-\check{a}) \tag{1}$$

and the floating-point baseline navigation solution $\hat{b}$ (114) may be updated with a list (118a) of partially fixed integer ambiguities $\check{a}$ to obtain a partial almost-fix navigation solution 124 which may approximate the fixed-ambiguity baseline navigation solution $\check{b}$ (120). The correction e in the floating-point baseline navigation solution $\hat{b}$ (114) may be defined as:

$$e=Q_{\hat{b}\hat{a}}Q_{\hat{a}}^{-1}(\hat{a}-\check{a}) \tag{2}$$

To increase the success rate of the fixing process, floating-point carrier-phase ambiguities $\hat{a}$ (112) in the original carrier-phase measurement ambiguity domain may be transformed into decorrelated floating-point ambiguities z (116) in the LAMBDA domain using a LAMBDA transformation Z, such that $$z=Z^T a \tag{3}$$

The error covariance between the floating-point baseline navigation solution $\hat{b}$ (114) and the LAMBDA-domain floating-point ambiguities z (116) may be $Q_{\hat{b}\hat{z}}$, and the error covariance of the LAMBDA-domain floating-point ambiguities z may be $Q_{\hat{z}}$, such that $$Q_{\hat{b}\hat{z}}=E(\hat{b}\hat{z}^T)=E(\hat{b}(Z^T\hat{a})^T)=E(\hat{b}\hat{a}^TZ)=E(\hat{b}\hat{a}^T)Z=Q_{\hat{b}\hat{a}}Z \text{ and}$$

$$Q\hat{b}\hat{a}=Q_{\hat{b}\hat{z}}Z^{-1} \tag{4}$$

In addition, $Q_{\hat{z}}=Z^T Q_{\hat{a}} Z$ and therefore $$Q_{\hat{a}}=Z^{-T}Q_{\hat{z}}Z^{-1} \tag{5}$$

It may follow from equations (2), (4), and (5) that $$e = Q_{b\check{a}}Q_{\check{a}}^{-1}(\hat{a}-\check{a}) = Q_{b\check{z}}Z^{-1}ZQ_{\check{z}}^{-1}Z^T(\hat{a}-\check{a}) = Q_{b\check{z}}Q_{\check{z}}^{-1}(Z^T\hat{a}-Z^T\check{a})$$

and from equation (3) that $e = Q_{\hat{b}\check{z}}Q_{\check{z}}^{-1}(\hat{z}-\check{z})$; therefore, equation (1) may become $$\check{b} = \hat{b} - Q_{b\check{z}}Q_{\check{z}}^{-1}(\hat{z}-\check{z}) \quad (6),$$

showing that the correction in the floating-point baseline navigation solution $\hat{b}$ may be equivalently defined and corrected in the LAMBDA domain. Accordingly, both partial fixing (e.g., fixing only a subset 122 of decorrelated floating-point carrier-phase ambiguities 116 to generate a partial almost-fix navigation solution 124) and partial correction updates (e.g., removing only a subset of associated errors in the floating-point baseline navigation solution 114) may be accomplished via fixing decorrelated floating-point ambiguities 116 in the LAMBDA domain. For example, any unfixed floating-point ambiguities 116 in the LAMBDA domain may be equivalent to floating-point ambiguities z, and therefore corresponding elements of the vector $(\hat{z}-\check{z})$ may be zero.

The system 100 may additionally determine an error covariance $Q_{\check{b}}$ of the partial almost-fix navigation solution 124 approximating the fixed-ambiguity baseline navigation solution $\check{b}$ (120). For example, if M is a matrix defining the decorrelated floating-point ambiguities z (116) being fixed in the LAMBDA domain (resulting in LAMBDA-domain fixed integer ambiguities 118) for the partial almost-fix navigation solution 124, M may be a diagonal matrix corresponding to the partial almost-fix navigation solution such that $$M = \begin{bmatrix} m_{11} & 0 & 0 & 0 \\ 0 & m_{22} & 0 & 0 \\ 0 & 0 & \ldots & 0 \\ 0 & 0 & 0 & m_{nn} \end{bmatrix};$$

$$m_{ii} = \begin{cases} 1(\text{fixed}), & i = 1, \ldots, n_f \\ 0(\text{float/unfixed}), & i = n_f + 1, \ldots, n \end{cases}$$

where $n_f$ may be the total number of LAMBDA-domain fixed ambiguities 118 with $(n-n_f)$ ambiguities remaining floating-point. A fully fixed navigation solution (i.e., a fixed-ambiguity navigation solution 120) may be indicated where M is set to the identity matrix, while a floating-point baseline navigation solution 114 may be indicated by a zero matrix. The partial update equation (6) may become $$\check{b} = \hat{b} - Q_{b\check{z}}Q_{\check{z}}^{-1}M(\hat{z}-\check{z}) \quad (7),$$

and the error covariance $$Q_{\check{b}} = Q_{\hat{b}} - Q_{\hat{b}\check{z}}(MQ_{\check{z}}^{-1} + Q_{\check{z}}^{-1}M - Q_{\check{z}}^{-1}MQ_{\check{z}}MQ_{\check{z}}^{-1})Q_{\check{z}\hat{b}} \quad (8)$$

of the partial almost-fix navigation solution 124 may be useful in error covariance analysis.

Generally, the system 100 may improve the PCF and the reliability of the fixing process through generation of a partial almost-fix navigation solution 124, e.g., by partial fixing of floating-point ambiguities 116 in the LAMBDA domain as described above. However, to ensure sufficiently high system integrity for incorporation in JPALS equipment 100*a* (FIG. 1A), partial fixing in the LAMBDA domain may be combined with other techniques. For example, Geometry Extra Redundant Almost Fix Solution (GERAFS) functionality of the JPALS 100*a* meets integrity requirements via the Probability of Almost Fix (PAF). The system 100*a* may improve on GERAFS functionality by fixing decorrelated floating-point ambiguities 116 in the LAMBDA domain rather than transforming the floating-point ambiguities back to their original domain for fixing. However, GERAFS may define the PAF as the probability that a partial almost-fix navigation solution 124 is bounded by protection levels defined or predetermined by the JPALS equipment 100*a*, which bounds errors in the partial almost-fix navigation solution 124 to the desired confidence level.

Similarly, if a fully fixed solution, i.e., a fixed-ambiguity baseline navigation solution 120, cannot be achieved without protection levels exceeding alert limits, the system 100 may generate the partial almost-fix solution 124 by fixing only a partial list 118*a* of floating-point ambiguities 116 to generate fixed integer ambiguities 118. The system 100 may compute an integrity bound (e.g., protection level) based on the GERAFS PAF, or the probability that the floating-point baseline navigation solution 114 is derived from floating-point ambiguities 112 within either Pull-in Regions (PIR) containing correctly fixed integer ambiguities (118) or a selected set of Enlarged Pull-in Regions (EPIR) containing incorrectly fixed floating-point ambiguities (116) with errors of no more than a single cycle or a small-multiple cycle. The system 100 may determine the probability that the partial almost-fix navigation solution is within the computed integrity bound based on a partial list of fixed integer ambiguities 118. The EPIR may provide additional system integrity at the expense of large protection levels even when only single-cycle errors are included.

Figure 2A:
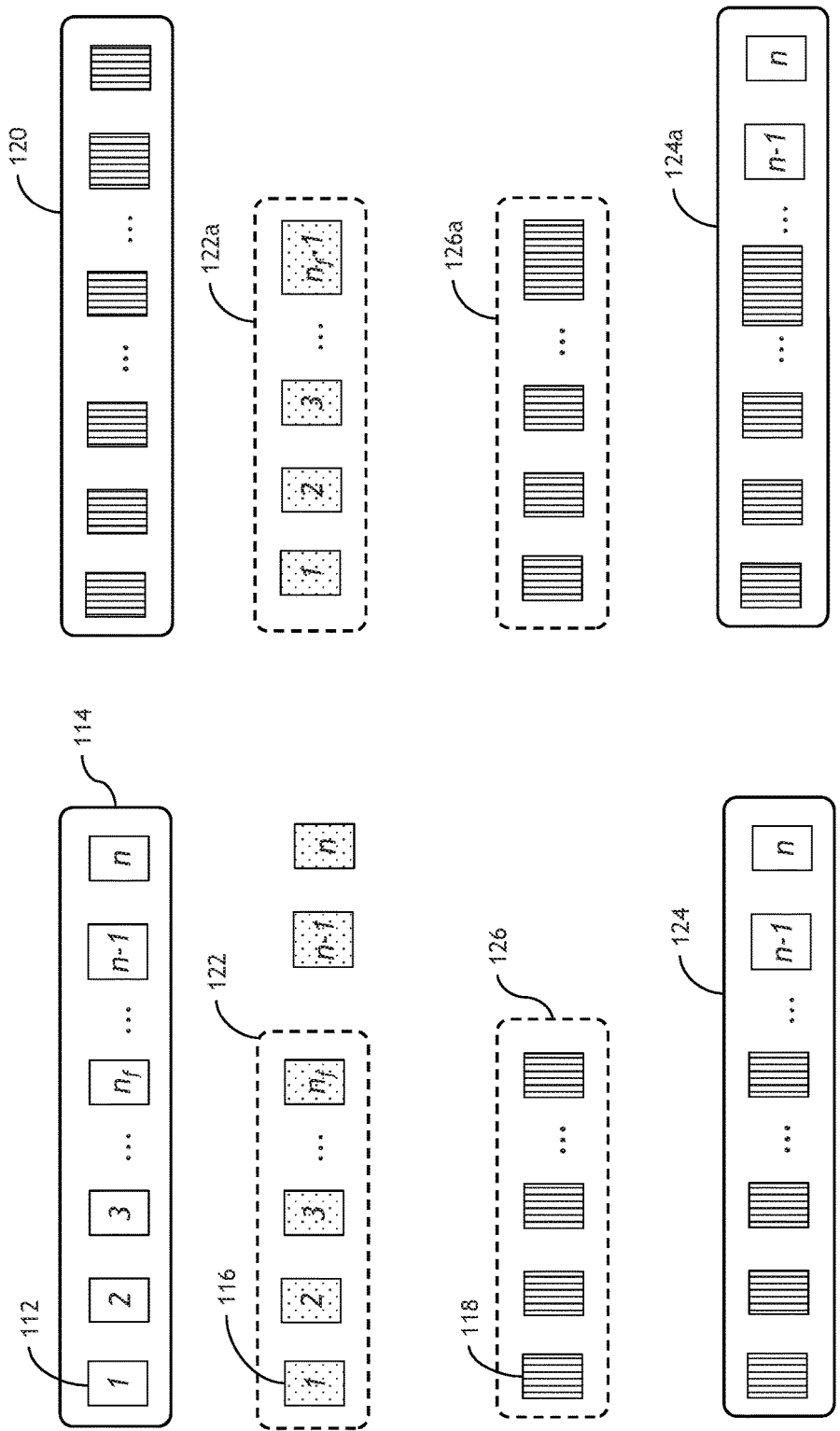
FIG. 2A is a block diagram illustrating operations of the system of FIG. 1B.

Referring to FIG. 2A, an implementation of the system 100 of FIG. 1B may generate a floating-point baseline navigation solution 114 including a set of n floating-point carrier-phase ambiguities 112. The system 100 may decorrelate the set of n floating-point carrier-phase ambiguities 112 in the LAMBDA domain to generate a set of n decorrelated floating-point ambiguities 116 corresponding to the set of n floating-point carrier-phase ambiguities 112. The system may select a subset 122 of $n_f$ decorrelated floating-point ambiguities to be fixed ($n_f \le n$). The system may determine protection levels and PAF; while protection levels remain below alert limits and PAF remains above a threshold (e.g., a threshold predetermined or preset by the system 100 or the JPALS equipment 100*a*), the system 100 may generate a set 126 of LAMBDA-domain fixed ambiguities 118 by fixing the subset 122 of $n_f$ decorrelated floating-point ambiguities 116 in the LAMBDA domain. The system may generate a partial almost-fix navigation solution 124 by replacing each floating-point carrier-phase ambiguity 112 of the floating-point baseline navigation solution 114 with the corresponding LAMBDA-domain fixed ambiguity 118 (i.e., the LAMBDA-domain fixed ambiguity corresponding to the decorrelated floating-point ambiguity 116 based on the particular floating-point carrier-phase ambiguity). In the case where the system 100 selects a subset 122 wherein $n_f$=n, and protection levels remain below alert limits while PAF remains above the threshold, the result may be a full fixed-ambiguity navigation solution 120 wherein every floating-point carrier-phase ambiguity 112 is replaced by a LAMBDA-domain fixed ambiguity 118. The system may output the full fixed-ambiguity navigation solution 120 when this solution is available. If protection levels rise above alert limits or PAF drops below the threshold for a partial almost-fix navigation solution 124 including a subset 122 of size $n_f$, the system 100 may continue the iterative process by decrementing $n_f$ to $(n_f - 1)$ by removing a decorrelated floating-point ambiguity 116 from the subset 122, resulting in a subset 122*a* including $(n_f-1)$ decorrelated floating-point ambiguities 116. The system 100 may generate a set 126a of LAMBDA-domain fixed ambiguities 118 by fixing the subset 122a of ($n_f$−1) decorrelated floating-point ambiguities 116 in the LAMBDA domain, and generate a partial almost-fix navigation solution 124a by replacing the corresponding floating-point carrier-phase ambiguities 112 of the floating-point baseline navigation solution 114 with the ($n_f$−1) LAMBDA-domain fixed ambiguities 118 of the subset 122a, and output the partial almost-fix navigation solution 124a if protection levels remain below alert limits and the PAF remains above the threshold. If the system 100 continues to decrement $n_f$ such that $n_f$ drops to zero, the system may output the original floating-point baseline navigation solution 114.

Figure 2B:
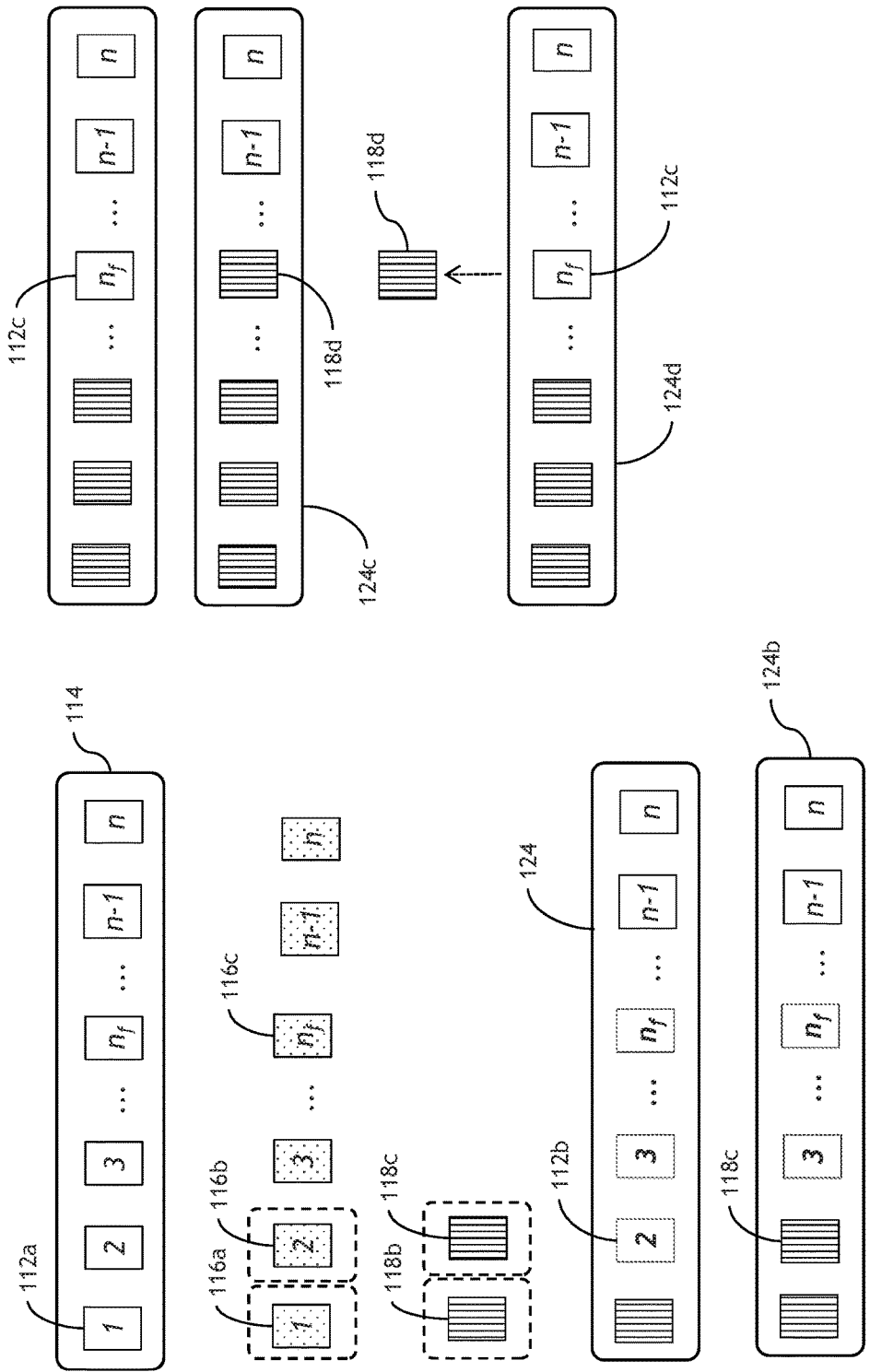
FIG. 2B is a block diagram illustrating alternative operations of the system of FIG. 1B.

Referring to FIG. 2B, an alternative implementation of the system 100 of FIG. 1B may generate a partial almost-fix navigation solution 124 by fixing floating-point ambiguities 116 in the LAMBDA domain individually, or sequentially, until protection levels reach the alert limits. For example, the system 100 may generate a floating-point baseline navigation solution 114 including an ordered set of corresponding LAMBDA-domain decorrelated floating-point ambiguities 116 based on each floating-point carrier-phase ambiguity 112 of the floating-point baseline navigation solution as in FIG. 2A above. The system 100 may order the LAMBDA-domain decorrelated floating-point ambiguities 116 of the floating-point baseline navigation solution 114, e.g. in descending order of PCF, the first decorrelated floating-point ambiguity 116a to be fixed having the highest PCF, the second decorrelated floating-point ambiguity 116b having the next highest PCF, etc. The system 100 may select the first LAMBDA-domain decorrelated floating-point ambiguity 116a to be fixed and add the selected first decorrelated floating-point ambiguity to a subset of $n_f$ decorrelated floating-point ambiguities (wherein the value of $n_f$ is initially set to zero). After protection levels and PAF are determined by the system 100, the system may fix the first selected decorrelated floating-point ambiguity 116a in the LAMBDA domain to the value of the corresponding LAMBDA-domain fixed ambiguity 118b. The system may generate a partial almost-fix navigation solution 124 by updating the first floating-point carrier-phase ambiguity 112a of the floating-point baseline navigation solution 114 (and corresponding to the selected first decorrelated floating-point ambiguity 116a) with the generated LAMBDA-domain fixed ambiguity 118b.

The system 100 may iterate through successive partial almost-fix navigation solutions 124b-d while protection levels remain below alert limits and PAF remains above the threshold level by selecting successive decorrelated floating-point ambiguities to fix (e.g., the decorrelated floating-point ambiguity 116 having the highest remaining PCF), one at a time, until alert limits are exceeded or PAF drops below the threshold. For example, the system 100 may continue the iterative process by selecting the second decorrelated floating-point ambiguity 116b (having the highest remaining PCF) to be fixed. The system 100 may fix the second decorrelated floating-point ambiguity 116b in the LAMBDA domain (to the value of the LAMBDA-domain fixed ambiguity 118c) and generate an updated partial almost-fix navigation solution 124b wherein the second floating-point carrier phase ambiguity 112b of the floating-point baseline navigation solution 114 (and the prior partial almost-fix navigation solution 124) is replaced with the second LAMBDA-domain fixed ambiguity 118c derived from the second decorrelated floating-point ambiguity 116b corresponding to the second floating-point carrier phase ambiguity 112b. As each successive floating-point ambiguity 116 is fixed to the value of a fixed integer ambiguity 118, the PCF may be lowered and more EPIR may be included to meet the PAF requirement. If the protection levels associated with a partial almost-fix navigation solution 124c generated by the system 100 exceed the alert limits (or if the PAF drops below the threshold), the system 100 may remove the most recently added LAMBDA-domain fixed ambiguity 118c in favor of the floating-point carrier phase ambiguity 112c it replaced, reverting to the immediately prior partial almost-fix navigation solution (124d) wherein protection levels remained below alert limits and PAF remained above the threshold value. For example, to achieve the partial almost-fix navigation solution 124c, the system 100 may have most recently replaced the $n_f$-th floating-point carrier-phase ambiguity 112c (of the set 114 of n floating-point carrier-phase ambiguities) with the LAMBDA-domain fixed ambiguity 118d derived from fixing the $n_f$-th decorrelated floating-point ambiguity 116c corresponding to the $n_f$-th floating-point carrier-phase ambiguity 112c. The system 100 may replace the most recently updated LAMBDA-domain fixed ambiguity 118d with the $n_f$-th floating-point carrier-phase ambiguity 112c to restore and output the immediately prior partial almost-fix navigation solution 124d. As the result of this process, the system 100 may output the original floating-point baseline navigation solution 114 (if $n_f$=0) or a full fixed-ambiguity navigation solution 120 (if $n_f$=n), as shown by FIG. 2A.

Figure 3A:
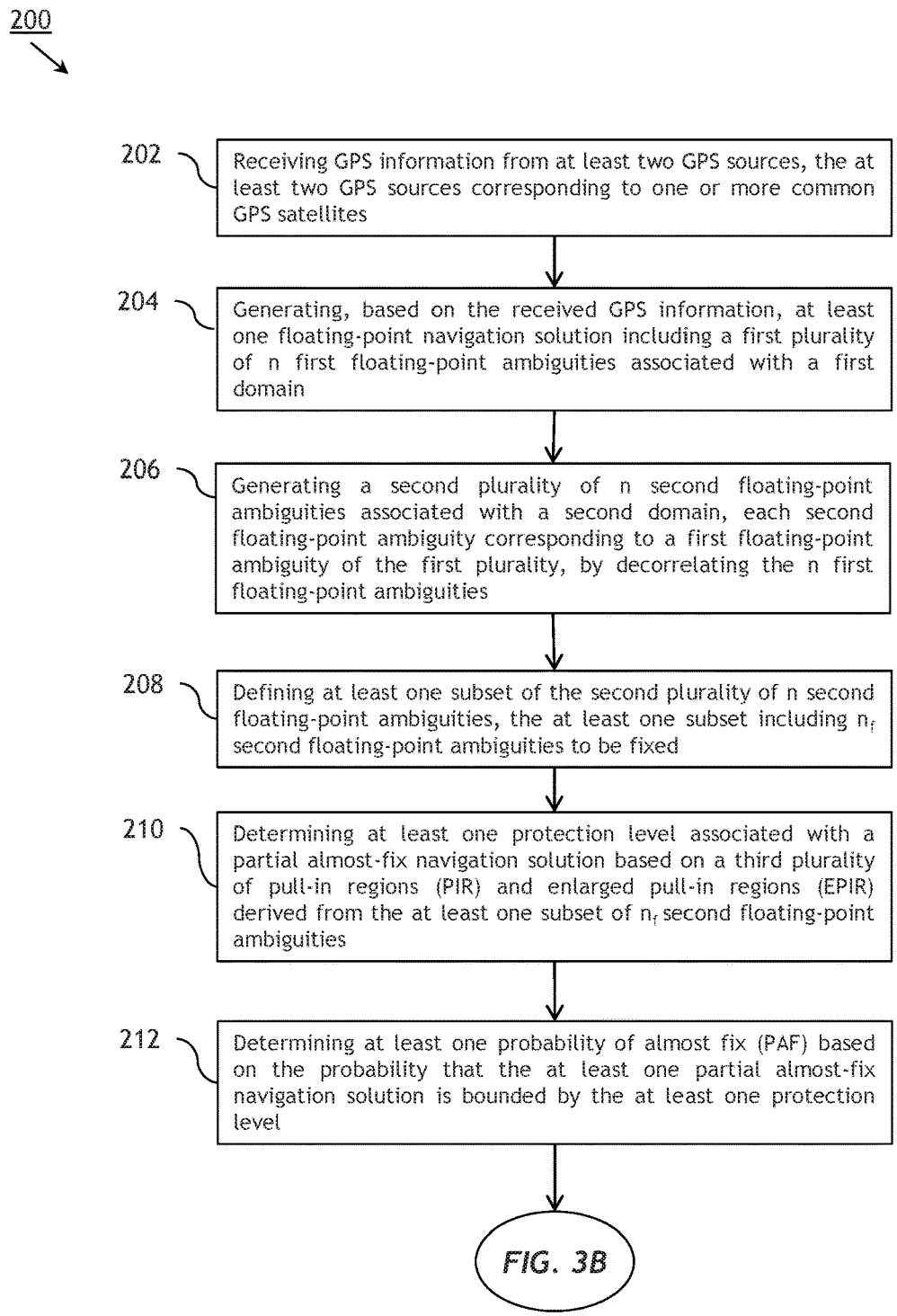
FIGS. 3A-3B are process flow diagrams illustrating a method according to embodiments of the inventive concepts disclosed herein.

Referring now to FIG. 3A, an exemplary embodiment of a method 200 for determining a precision navigation solution according to the inventive concepts disclosed herein may include one or more of the following steps. At a step 202, the system 100 may receive GPS information from at least two GPS sources, the GPS sources corresponding to one or more common GPS satellites 106. For example, the system 100 may be embodied in aircraft-based JPALS equipment 100a which receives GPS information directly from common GPS satellites 106 via a GPS receiver 112 onboard the aircraft 102 in which the system 100 is embodied as well as GPS information 108, 108a from a ship 104 or other vehicle proximal to the aircraft 102. The system 100 may receive GPS carrier waves associated with GPS signals.

At a step 204, the system 100 generates a floating-point baseline navigation solution 114 including a set of n floating-point carrier-phase ambiguities 112 based on the received GPS information. The floating-point baseline navigation solution 114 and set of n floating-point carrier-phase ambiguities 112 may be associated with the original domain (e.g., carrier-phase measurement ambiguity domain).

At a step 206, the system 100 generates a set of n Least-squares AMBiguity Decorrelation Adjustment (LAMBDA)-domain floating-point ambiguities 116 corresponding to the set of n floating-point carrier phase ambiguities 112 by decorrelating the set of n floating-point carrier-phase ambiguities via LAMBDA algorithms. The system 100 may generate error covariances associated with the LAMBDA-domain floating-point ambiguities 116.

At a step 208, the system 100 defines a subset 122 of the set of n decorrelated LAMBDA-domain floating-point ambiguities 116, the subset 122 including $n_f$ decorrelated LAMBDA-domain floating-point ambiguities to be fixed in the LAMBDA domain.

At a step 210, the system 100 determines protection levels associated with a partial almost-fix navigation solution 124 based on the probability that the partial almost-fix navigation solution 124 is derived from within a PIR of correctly fixed LAMBDA-domain fixed integer ambiguities 118 (e.g., having zero errors) or an EPIR of incorrect (e.g., unfixed, incorrectly fixed) LAMBDA-domain floating-point integer ambiguities 116 wherein the errors associated with the LAMBDA-domain floating-point integer ambiguities are no more than a single cycle (or, in the alternative, multiple cycles). The EPIR may be narrowed to incorrectly fixed LAMBDA-domain floating-point integer ambiguities 116 involving errors of a single cycle.

At a step 212, the system 100 determines a PAF based on the probability that the partial almost-fix navigation solution 124 is bounded by the determined protection levels.

Figure 3B:
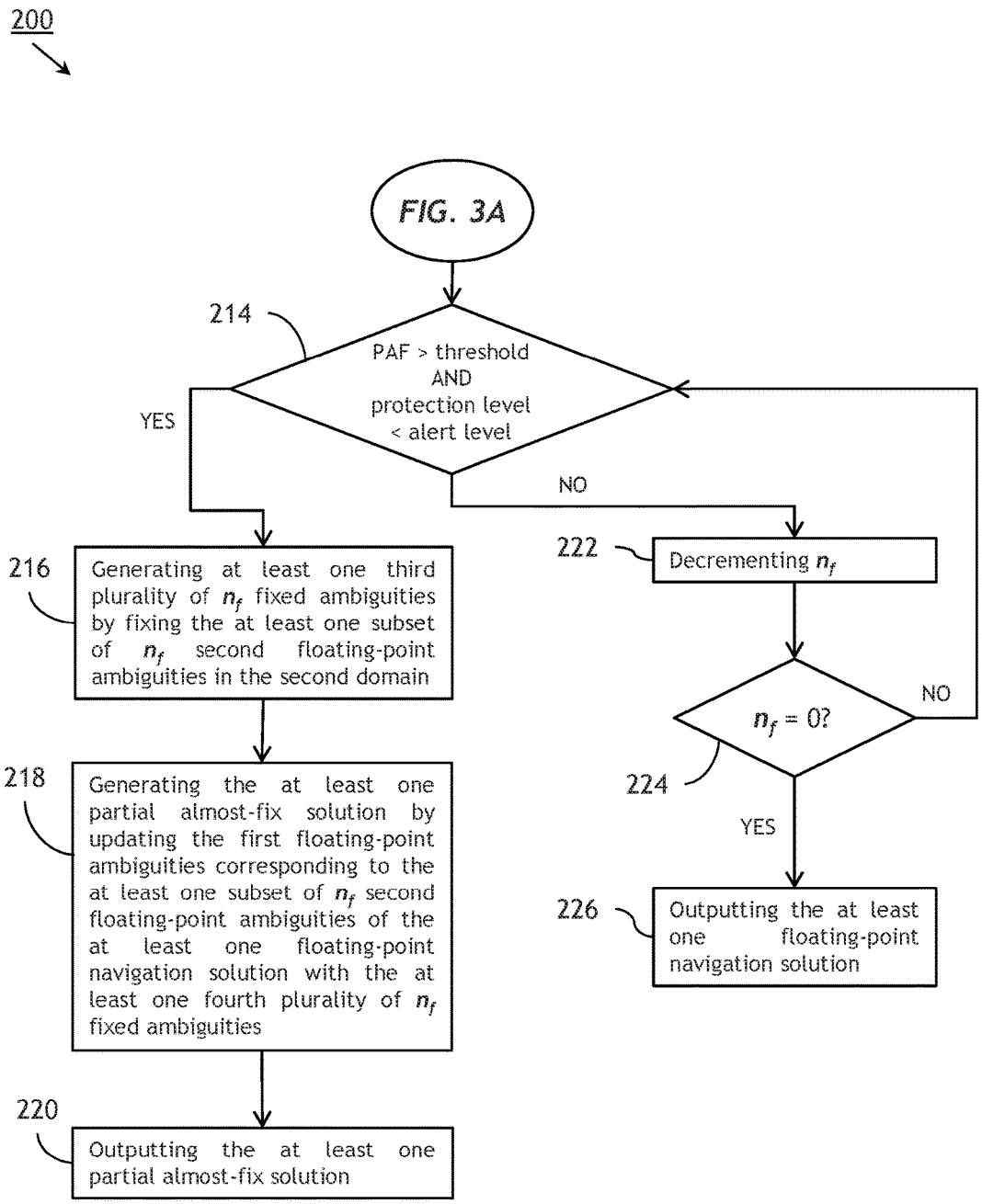

Referring to FIG. 3B, at a step 214, the system 100 determines whether the PAF is higher than a predetermined threshold and the determined protection levels are under predetermined alert limits.

While the PAF is above the threshold value and protection levels are under alert limits, at a step 216, the system 100 generates a set 126 of $n_f$ LAMBDA-domain fixed integer ambiguities 118 by fixing the subset 122 of $n_f$ decorrelated LAMBDA-domain floating-point ambiguities 116 in the LAMBDA domain.

At a step 218, the system 100 generates the partial almost-fix navigation solution 124 by updating the $n_f$ floating-point carrier-phase ambiguities 112 (of the floating-point baseline navigation solution 114) corresponding to the subset 122 of $n_f$ decorrelated LAMBDA-domain floating-point ambiguities 116 with the set 126 of $n_f$ LAMBDA-domain fixed integer ambiguities 118.

At a step 220, the system 100 outputs the updated partial almost-fix navigation solution 124. The output solution may be a full fixed ambiguity solution 120.

If either the PAF drops below the threshold or the protection levels exceed the alert limits, at a step 222 the system 100 decrements $n_f$ by removing a decorrelated LAMBDA-domain floating point ambiguity 116 from the subset 122 of $n_f$ decorrelated LAMBDA-domain floating-point ambiguities, thereby setting $n_f$ to $n_f - 1$. At a step 224, the system 100 determines whether $n_f$ is zero (e.g., the subset 122 of $n_f$ decorrelated LAMBDA-domain floating-point ambiguities 116 is empty). If $n_f$ is non-zero, the method 200 resumes at step 214 with the decremented $n_f$. If $n_f$ is zero, at a step 226 the system 100 outputs the floating-point baseline navigation solution 114.

Figure 4A:
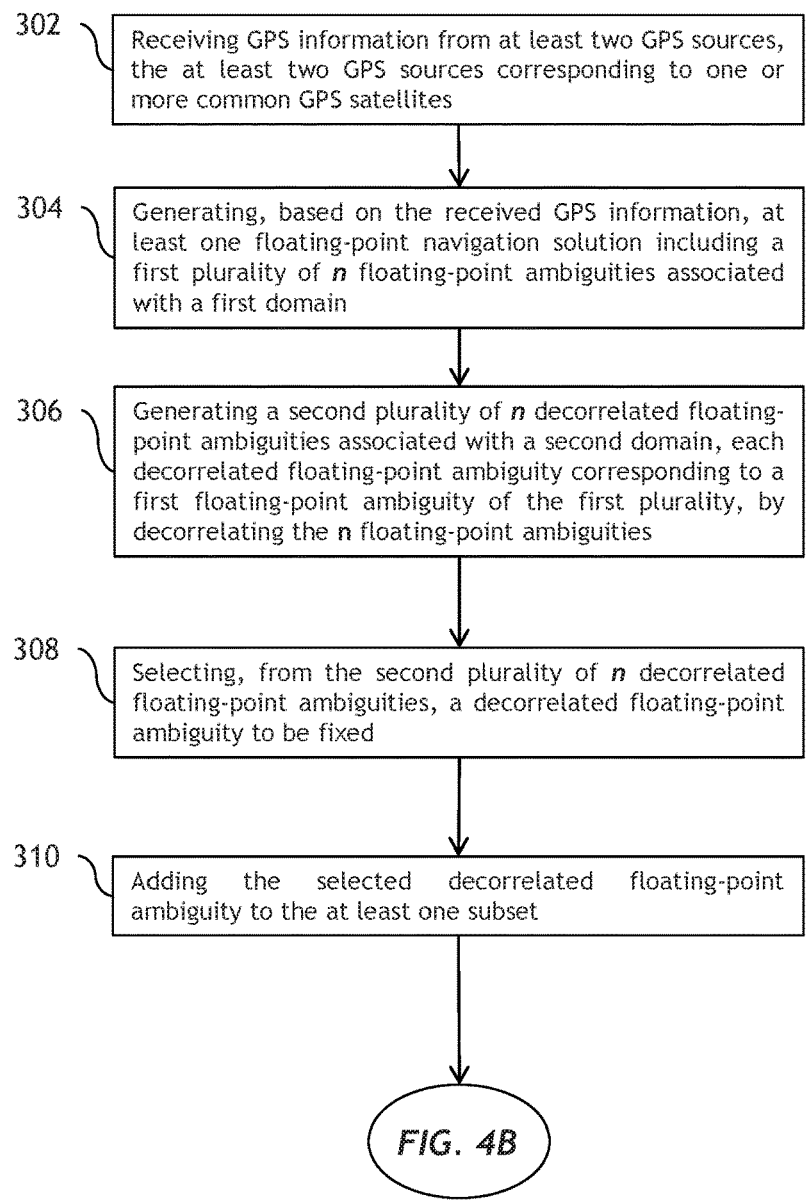
FIGS. 4A-4C are process flow diagrams illustrating a method according to embodiments of the inventive concepts disclosed herein.

Referring now to FIG. 4A, an exemplary embodiment of a method 300 for determining a precision navigation solution according to the inventive concepts disclosed herein may be implemented similarly to the method 200 of FIGS. 3A-3B, in that the steps 302 and 304 are implemented similarly to the steps 202 and 204 of the method 200.

At a step 306, the system 100 generates a set of n LAMBDA-domain floating-point ambiguities 116 corresponding to the set of n floating-point carrier phase ambiguities 112 by decorrelating the set of n floating-point carrier-phase ambiguities via LAMBDA algorithms. The system 100 may generate error covariances associated with the decorrelated LAMBDA-domain floating-point ambiguities 116. The system 100 may order the n decorrelated floating-point ambiguities 116, e.g., by descending PCF (the first decorrelated floating-point ambiguity 116a having the highest PCF, the second decorrelated floating-point ambiguity 116b having the next highest PCF, and so forth).

At a step 308, the system 100 selects from the set of n decorrelated LAMBDA-domain floating-point ambiguities 116 a single decorrelated LAMBDA-domain floating-point ambiguity 116a to be fixed. The system 100 may select the first decorrelated LAMBDA-domain floating-point ambiguity 116a having the highest PCF.

At a step 310, the system 100 adds the selected decorrelated LAMBDA-domain floating-point ambiguity 116a to a subset 122 of $n_f$ decorrelated LAMBDA-domain floating-point ambiguities.

Figure 4B:
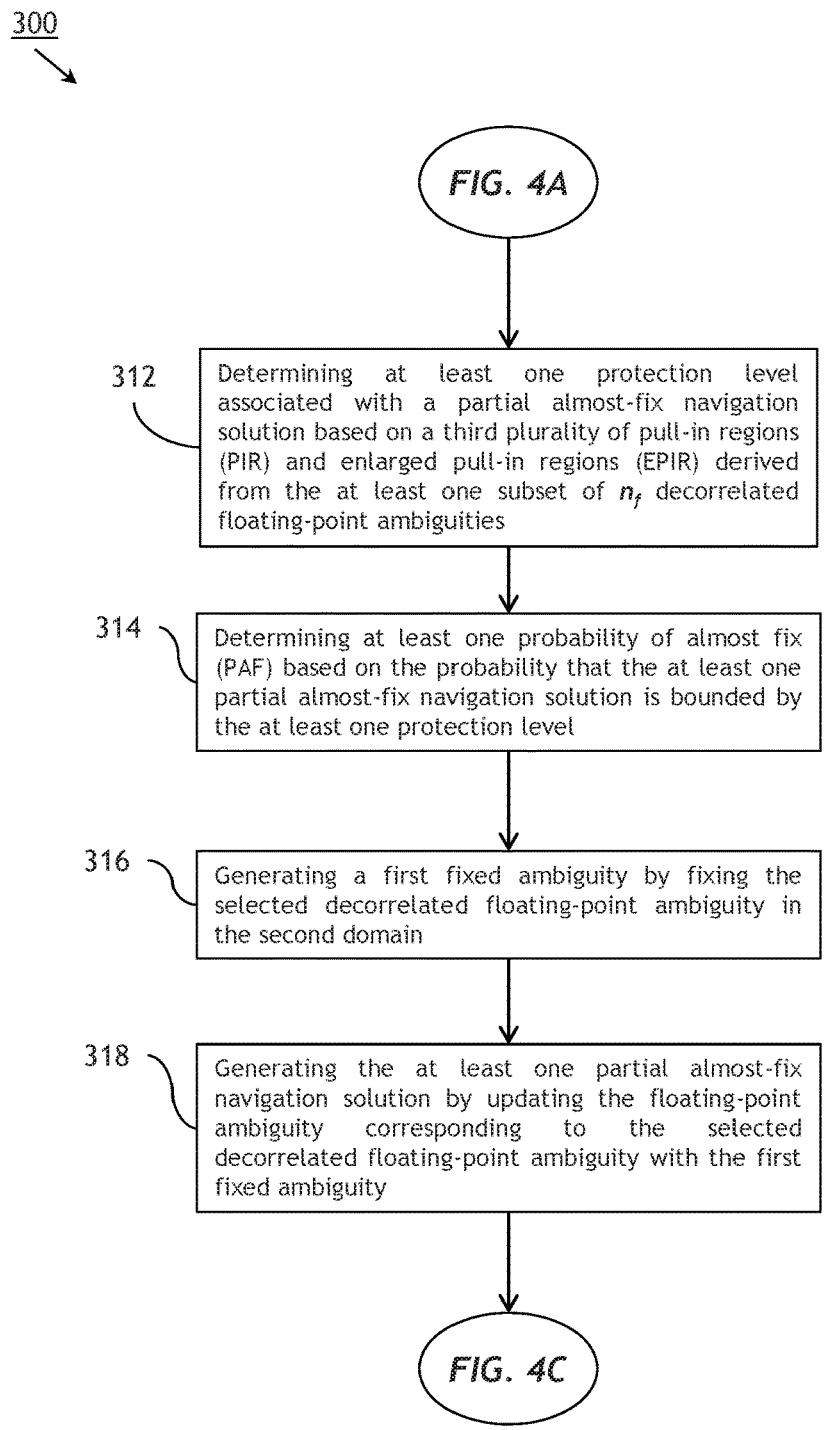

Referring to FIG. 4B, at a step 312, the system 100 determines protection levels associated with a partial almost-fix navigation solution 124 based on the probability that the partial almost-fix navigation solution 124 is derived from within a PIR of correctly fixed LAMBDA-domain fixed integer ambiguities 118 (e.g., having zero errors) or an EPIR of incorrect (e.g., unfixed, incorrectly fixed) LAMBDA-domain floating-point integer ambiguities 116 wherein the errors associated with the LAMBDA-domain floating-point integer ambiguities 116 are no more than a single cycle (or, in the alternative, multiple cycles). The EPIR may be narrowed to incorrectly fixed LAMBDA-domain floating-point integer ambiguities 116 involving errors of a single cycle or less.

At a step 314, the system 100 determines a PAF based on the probability that the partial almost-fix navigation solution 124 is bounded by the determined protection levels.

At a step 316, the system 100 generates a LAMBDA-domain fixed ambiguity 118b by fixing the selected decorrelated LAMBDA-domain floating-point ambiguity 116a in the LAMBDA domain.

At a step 318, the system 100 generates the partial almost-fix navigation solution 124 by updating the floating-point carrier-phase ambiguity 112a of the floating-point baseline navigation solution 114 and corresponding to the selected decorrelated LAMBDA-domain floating-point ambiguity 116a with the generated LAMBDA-domain fixed ambiguity 118b.

Figure 4C:
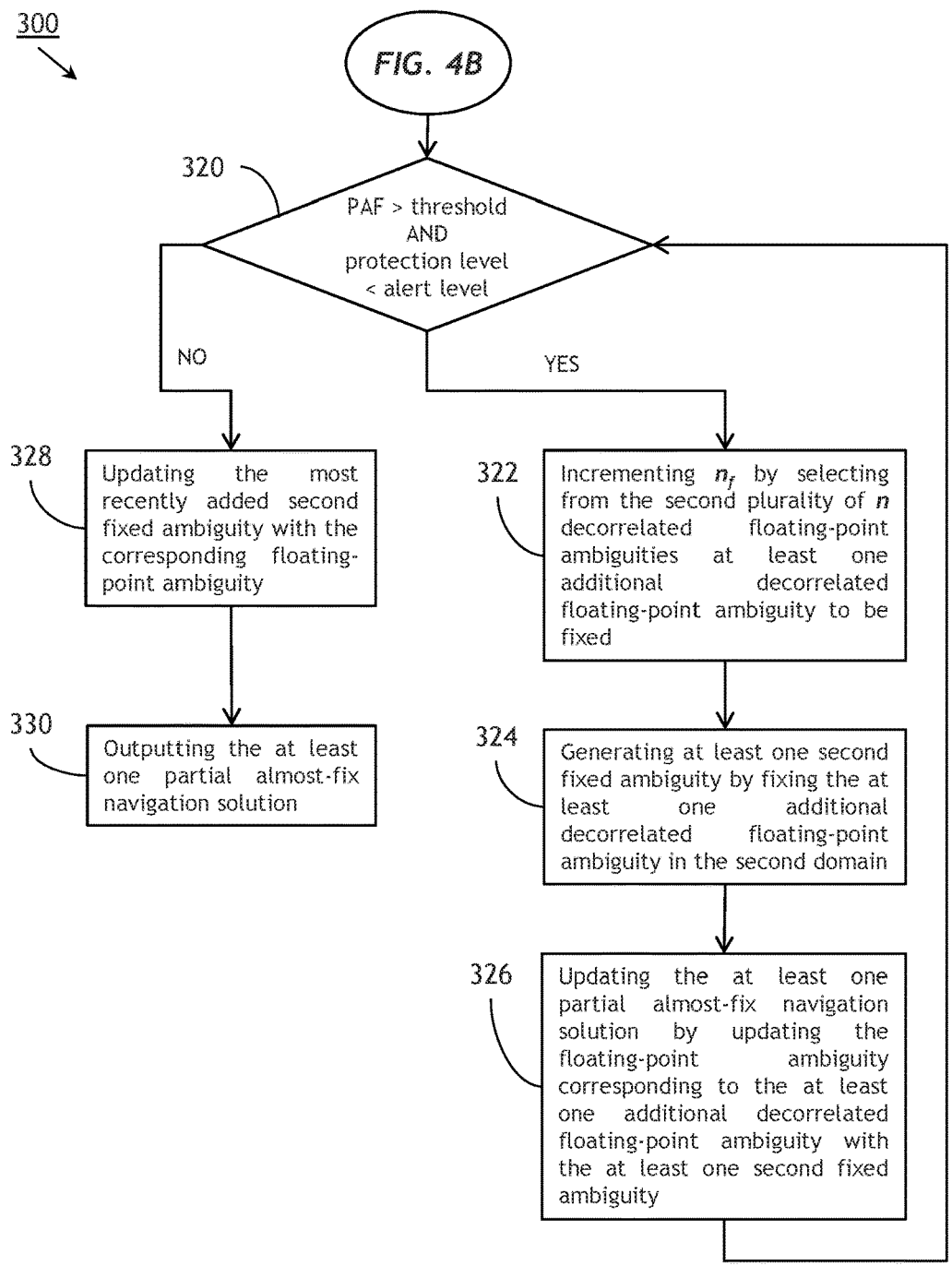

Referring to FIG. 4C, at a step 320, the system 100 determines whether the PAF is higher than a predetermined threshold and the determined protection levels are under predetermined alert limits.

While the PAF is above the threshold value and protection levels are under alert limits, at a step 322, the system 100 increments $n_f$ by selecting an additional decorrelated LAMBDA-domain floating-point ambiguity 116b to be fixed. For example, the system 100 may select the first unfixed decorrelated LAMBDA-domain floating-point ambiguity 116b (e.g., the unfixed decorrelated LAMBDA-domain floating-point ambiguity having the highest remaining PCF, or the $(n_f+1)$th decorrelated LAMBDA-domain floating-point ambiguity).

At a step 324, the system 100 generates an additional LAMBDA-domain fixed ambiguity 118c by fixing the selected decorrelated LAMBDA-domain floating-point ambiguity 116b in the LAMBDA domain.

At a step 326, the system 100 updates the partial almost-fix navigation solution (124b) by updating the floating-point carrier-phase ambiguity 112b of the partial almost-fix navigation solution and corresponding to the selected decorrelated LAMBDA-domain floating-point ambiguity 116b with the generated LAMBDA-domain fixed ambiguity 118c based on the selected decorrelated LAMBDA-domain floating-point ambiguity 116b.

If either the PAF drops below the threshold or the protection levels reach the alert limits, at a step 328 the system 100 updates the most recently added LAMBDA-domain fixed ambiguity 118d of the partial almost-fix navigation solution 124c with the corresponding floating-point carrier-phase ambiguity 112b that the most recently added fixed ambiguity 118d replaced.

At a step 330, the system 100 outputs the updated partial almost-fix navigation solution 124d. The output solution may be a full fixed ambiguity solution 120 (e.g., if $n_f=n$); the output solution may be the original floating-point baseline navigation solution 114 (e.g., if $n_f=0$).

As will be appreciated from the above, systems and methods according to embodiments of the inventive concepts disclosed herein may simplify the partial fixing process. As both the fixing of decorrelated floating-point ambiguities 116 and the corresponding update of the floating-point baseline navigation solution 114 with fixed ambiguities 118 are accomplished in the LAMBDA domain, the partial list of fixed integer ambiguities used to update the floating-point baseline navigation solution is straightforward. Similarly, as only the partial list of fixed integer ambiguities 118 is used to compute the PAF of the partial almost-fix navigation solution 124, high system integrity can be preserved within tighter protection levels compared to conventional GERAFS functionality.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A high-integrity differential GPS system, comprising at least one processor configured to:
   receive at least one GPS measurement from each of two or more GPS sources, each GPS source corresponding to one or more common GPS satellites;
   generate, based on the received GPS measurements, at least one floating-point navigational solution including a first plurality of n first floating-point ambiguities, the at least one floating-point navigational solution and the first plurality of n first floating-point ambiguities associated with a first domain;
   generate a second plurality of n second floating-point ambiguities associated with a second domain, each second floating-point ambiguity corresponding to a first floating-point ambiguity of the first plurality, by decorrelating the n first floating-point ambiguities;
   define at least one subset of the second plurality of n second floating-point ambiguities, the at least one subset including $n_f$ second floating-point ambiguities to be fixed;
   determine at least one protection level associated with at least one partial almost-fix solution based on a third plurality of pull-in regions (PIR) and enlarged pull-in regions (EPIR) derived from the at least one subset of $n_f$ second floating-point ambiguities;
   determine at least one probability of almost-fix (PAF) based on a probability that the at least one partial almost-fix solution is bounded by the at least one protection level;
   while the at least one PAF is above a threshold value and the at least one protection level is below an alert level:
   generate at least one fourth plurality of $n_f$ fixed ambiguities by fixing the at least one subset of $n_f$ second floating-point ambiguities in the second domain;
   generate the at least one partial almost-fix solution by updating the first floating-point ambiguities of the at least one floating-point navigation solution, the updated first floating-point ambiguities corresponding to the at least one subset of $n_f$ second floating-point ambiguities, with the at least one fourth plurality of $n_f$ fixed ambiguities; and
   output the at least one partial almost-fix solution;
   if 1) the at least one PAF is below the threshold value or 2) the at least one protection level is above the alert level, decrement $n_f$; and
   if $n_f$ is zero, output the at least one floating-point navigation solution.

2. The system of claim 1, wherein the at least one processor is configured to generate at least one error covariance associated with the at least one second floating-point integer ambiguity.

3. The system of claim 1, wherein:
   the at least one second float integer ambiguity includes at least one carrier phase integer ambiguity decorrelated by a Least-squares AMBiguity Decorrelation Adjustment (LAMBDA) algorithm; and
   the second domain is a LAMBDA domain.

4. The system of claim 1, wherein the system is embodied in aircraft-based Joint Precision Approach and Landing System (JPALS) equipment and the at least one processor is coupled to a first GPS receiver of an aircraft, the at least one processor configured to receive at least one of a first GPS measurement from the first GPS receiver and a second GPS measurement from at least one second GPS receiver of a vehicle proximate to the aircraft.

5. The system of claim 1, wherein the PIRs include one or more correctly fixed ambiguities and the EPIRs surround the PIRs and include one or more incorrectly fixed ambiguities associated with one or more single-cycle errors.

6. The system of claim 1, wherein the at least one processor is configured to:
   define at least one subset of the second plurality of n second floating-point ambiguities, the at least one subset including $n_f$ second floating-point ambiguities to be fixed, by:
      selecting from the second plurality of n second floating-point ambiguities at least one second floating-point ambiguity to be fixed; and
      adding the selected second floating-point ambiguity to the at least one subset;
   generate a first fixed ambiguity by fixing the selected second floating-point ambiguity in the second domain;
   generate the at least one partial almost-fix solution by updating the first floating-point ambiguity corresponding to the selected second floating-point ambiguity with the first fixed ambiguity;
   while the at least one PAF is above the threshold value and the at least one protection level is below the alert level:
      increment $n_f$ by selecting from the second plurality of n second floating-point ambiguities at least one additional second floating-point ambiguity to be fixed;

generate at least one second fixed ambiguity by fixing the at least one additional second floating-point ambiguity in the second domain;
update the at least one partial almost-fix solution by updating the first floating-point ambiguity corresponding to the at least one additional second floating-point ambiguity with the at least one second fixed ambiguity; and
if 1) the at least one PAF is below the threshold value or 2) the at least one protection level is above the alert level:
decrement $n_f$ by updating the most recently added second fixed ambiguity with the corresponding first floating-point ambiguity; and
output the at least one partial almost-fix solution.

7. The system of claim 6, wherein:
the second plurality of n decorrelated floating-point ambiguities is a sequential plurality of n decorrelated floating-point ambiguities;
the at least one subset is a sequence of $n_f$ decorrelated floating-point ambiguities to be fixed; and
the at least one processor is configured to:
select from the sequential plurality of n decorrelated floating-point ambiguities the first decorrelated floating-point ambiguity to be fixed; and
while the at least one PAF is above the threshold value and the at least one protection level is below the alert level, increment $n_f$ by selecting from the sequential plurality of n decorrelated floating-point ambiguities the first unfixed decorrelated floating-point ambiguity to be fixed.

8. The system of claim 7, wherein the at least one sequential plurality of n second floating-point ambiguities is generated by ordering the second plurality of n decorrelated floating-point ambiguities by descending Probability of Correct Fix (PCF).

9. A method for determining high-integrity navigation solutions, comprising:
receiving, via a GPS system including at least one processor, GPS information from at least two GPS sources, the at least two GPS sources corresponding to one or more common GPS satellites;
generating, with the at least one processor, based on the received GPS information, at least one floating-point navigation solution including a first plurality of n first floating-point ambiguities associated with a first domain;
generating, with the at least one processor, a second plurality of n second floating-point ambiguities associated with a second domain, each second floating-point ambiguity corresponding to a first floating-point ambiguity of the first plurality, by decorrelating the n first floating-point ambiguities;
defining, with the at least one processor, at least one subset of the second plurality of n second floating-point ambiguities, the at least one subset including $n_f$ second floating-point ambiguities to be fixed;
determining, with the at least one processor, at least one protection level associated with at least one partial almost-fix solution, the at least one partial almost-fix solution based on a third plurality of pull-in regions (PIR) and enlarged pull-in regions (EPIR) derived from the at least one subset of $n_f$ second floating-point ambiguities;
determining, with the at least one processor, at least one probability of almost fix (PAF) based on a probability that the at least one partial almost-fix solution is bounded by the at least one protection level;
while the at least one PAF is above a threshold value and the at least one protection level is below an alert level:
generating, with the at least one processor, at least one fourth plurality of $n_f$ fixed ambiguities by fixing the at least one subset of of second floating-point ambiguities in the second domain;
generating, with the at least one processor, the at least one partial almost-fix solution by updating the first floating-point ambiguities of the at least one floating-point navigation solution, the updated first floating-point ambiguities corresponding to the at least one subset of $n_f$ second floating-point ambiguities, with the at least one fourth plurality of $n_f$ fixed ambiguities; and
outputting, with the at least one processor, the at least one partial almost-fix solution;
if 1) the at least one PAF is below the threshold value or 2) the at least one protection level is above the alert level, decrementing $n_f$ with the at least one processor; and
if $n_f$ is zero, outputting, with the at least one processor, the at least one floating-point navigation solution.

10. The method of claim 9, wherein receiving, via a GPS system including at least one processor, GPS information from at least two GPS sources, the at least two GPS sources corresponding to one or more common GPS satellites includes:
receiving, via an aircraft-based JPALS system, at least one of a first GPS measurement sensed by a first GPS receiver of an aircraft and a second GPS measurement sensed by a second GPS receiver of a vehicle proximate to the aircraft, the first GPS measurement and the second GPS measurement corresponding to one or more common GPS satellites.

11. The method of claim 9, wherein generating, with the at least one processor, a second plurality of n second floating-point ambiguities associated with a second domain, each second floating-point ambiguity corresponding to a first floating-point ambiguity of the first plurality, by decorrelating the n first floating-point ambiguities includes:
generating, with the at least one processor, one or more error covariances associated with the second plurality of n second floating-point ambiguities, the one or more error covariances associated with the second domain, by decorrelating the first plurality of n first floating-point ambiguities.

12. The method of claim 9, wherein generating, with the at least one processor, a second plurality of n second floating-point ambiguities associated with a second domain, each second floating-point ambiguity corresponding to a first floating-point ambiguity of the first plurality, by decorrelating the n first floating-point ambiguities includes:
generating, with the at least one processor, the second plurality of n second floating-point ambiguities associated with a Least-squares AMBiguity Decorrelation Adjustment (LAMBDA) domain by decorrelating the plurality of n first floating-point ambiguities via at least one LAMBDA algorithm.

13. The method of claim 9, wherein determining, with the at least one processor, at least one protection level associated with at least one partial almost-fix solution, the at least one partial almost-fix solution based on a third plurality of pull-in regions (PIR) and enlarged pull-in regions (EPIR) derived from the at least one subset of $n_f$ second floating-point ambiguities includes:

determining, with the at least one processor, at least one protection level associated with the at least one partial almost-fix solution, the at least one partial almost-fix solution generated by updating at least one first floating-point ambiguity of the at least one floating-point navigation solution with a fixed ambiguity generated by fixing the second floating-point ambiguity corresponding to the at least one first floating-point ambiguity and of the at least one subset, based on the third plurality of PIRs including one or more correctly fixed ambiguities and EPIRs including one or more incorrectly fixed ambiguities derived from the at least one subset of $n_f$ second floating-point ambiguities.

14. The method of claim 13, wherein determining, with the at least one processor, at least one protection level associated with the at least one partial almost-fix solution, the at least one partial almost-fix solution generated by updating at least one first floating-point ambiguity of the at least one floating-point navigation solution with a fixed ambiguity generated by fixing the second floating-point ambiguity corresponding to the at least one first floating-point ambiguity and of the at least one subset, based on a third plurality of PIRs including one or more correctly fixed ambiguities and EPIRs including one or more incorrectly fixed ambiguities derived from the at least one subset of $n_f$ second floating-point ambiguities includes:

determining, with the at least one processor, at least one protection level associated with the at least one partial almost-fix solution, the at least one partial almost-fix solution generated by updating at least one first floating-point ambiguity of the at least one floating-point navigation solution with a fixed ambiguity generated by fixing the second floating-point ambiguity corresponding to the at least one first floating-point ambiguity and of the at least one subset, based on the third plurality of PIRs including one or more correctly fixed ambiguities and EPIRs including one or more incorrectly fixed ambiguities derived from the at least one subset of $n_f$ second floating-point ambiguities, the one or more incorrectly fixed ambiguities associated with a single-cycle error.

* * * * *